(12) United States Patent
Kros

(10) Patent No.: US 7,915,198 B2
(45) Date of Patent: Mar. 29, 2011

(54) AQUEOUS SOLUTION OF NON-COLLOIDAL SILICIC ACID AND BORIC ACID

(75) Inventor: Willem Adrianus Kros, Welgemoed (ZA)

(73) Assignee: Sabalo, N.V., Curacao (AN)

( * ) Notice: Subject to any disclaimer, the term of this patent is extended or adjusted under 35 U.S.C. 154(b) by 798 days.

(21) Appl. No.: 10/515,536

(22) PCT Filed: May 28, 2003

(86) PCT No.: PCT/NL03/00404
§ 371 (c)(1),
(2), (4) Date: Sep. 9, 2005

(87) PCT Pub. No.: WO03/101915

PCT Pub. Date: Dec. 11, 2003

(65) Prior Publication Data

US 2006/0178268 A1     Aug. 10, 2006

(30) Foreign Application Priority Data

May 31, 2002  (EP) .................................... 02077147

(51) Int. Cl.
*A01N 59/04*     (2006.01)

(52) U.S. Cl. ........ 504/101; 504/164; 504/187; 504/193; 426/442; 424/600; 424/659; 423/325

(58) Field of Classification Search ............. 504/101, 504/187, 122, 153, 164, 193; 424/659, 600; 556/405; 426/74, 442; 71/31; 423/325
See application file for complete search history.

(56) References Cited

U.S. PATENT DOCUMENTS

| | | | | |
|---|---|---|---|---|
| 2,630,410 A | * | 3/1953 | Clapsadle et al. | 516/86 |
| 3,462,374 A | | 8/1969 | Klosak | |
| 5,183,061 A | * | 2/1993 | Wiegand et al. | 128/897 |
| 5,458,812 A | | 10/1995 | Brekau et al. | |
| 5,948,433 A | * | 9/1999 | Burton et al. | 424/448 |
| 6,133,198 A | * | 10/2000 | Bengsch et al. | 504/187 |
| 6,197,986 B1 | * | 3/2001 | Seguin et al. | 556/405 |
| 6,383,534 B1 | * | 5/2002 | Dyrr et al. | 426/74 |
| 6,689,392 B2 | * | 2/2004 | Lifshitz | 424/638 |

FOREIGN PATENT DOCUMENTS

| | | | |
|---|---|---|---|
| DE | 199 18 692 A1 | | 11/2000 |
| EP | 0 835 854 A1 | | 4/1998 |
| SE | WO 98/56715 | * | 12/1998 |
| WO | WO 98/56715 A | | 12/1998 |

OTHER PUBLICATIONS

Henk-Maarten Laane, MD. Ph.D. Silicon and diet, Silicon is the most common mineral on earth! What role does this "forgotten" trace element play in the diet of human beings? http://www.biosulf.org/3/A/1/pop2.htm.*

* cited by examiner

*Primary Examiner* — Ling-Siu Choi
*Assistant Examiner* — Bijan Ahvazi
(74) *Attorney, Agent, or Firm* — The Webb Law Firm

(57) ABSTRACT

The present invention includes an aqueous solution, comprising boric acid and non-colloidal silicic acid. This solution can also comprise a water absorbing additive. The solution contains bioavailable non-colloidal silicic acid, and the solution is stable for more than one year. The invention also describes a method for the preparation of a solution in which one or more silicon and boron compounds are hydrolysed in an acidic solution containing one or more dissolved water absorbing additives.

12 Claims, No Drawings

AQUEOUS SOLUTION OF NON-COLLOIDAL SILICIC ACID AND BORIC ACID

FIELD OF THE INVENTION

The invention relates to aqueous solutions containing bioavailable silicon and boron, that can be used to strengthen plants or trees, or as food or feed additives to humans and animals. The invention is also related to the preparation of stable solutions containing bioavailable silicon and boron.

BACKGROUND OF THE INVENTION

Silicon is an essential nutrient for plants and is present as low concentrated orthosilicic acid ($H_2SiO_4$) in soil, minerals and ocean water. In modern agriculture systems, the nutrient solutions are mostly deficient in orthosilicic acid and the added silicates are unable to compensate for this deficiency. Silicic acid is sometimes included in formulations of nutrients but is not enough bioavailable as such, because they are as silicates poorly soluble in water.

Silicates are not well absorbed by organisms. Probably, orthosilicic acid is the highest bioavailable silicon compound for diatomes, plants, animals and humans. In water, silicates and silicagel are slowly hydrolysed into orthosilicic acid, which is poorly soluble and polymerises quickly into small particles (non-colloidal material (non-opalescent, non-turbid)). These polymerised structures directly aggregate into longer chains (still non-colloidal), leading to a real network (colloid; opalescent, turbid). This process results in the formation of a soft gel, which is poorly bioavailable. The formation of these colloids and gels is pH dependent. The longest gelling time occurs at pH 2. At lower and more alkaline pH, the time for colloid and finally gel formation decreases (Iler R. K. The Chemistry of Silica. Wiley: New York, 1979). According to this reference, the stages from monomer to sol-gel polymerization can be summarised as follows:
1. monomer orthosilicic acid in acid medium;
2. polymerisation of orthosilicic acid monomers into small oligomers (mainly dimers, trimers and tetramers, linear or cyclic);
3. further condensation into linear or randomly branched polymers (small particles, ±2 nm) (pre-sol);
4. growth of these particles (sol, colloidal, particle size of about 5-100 nm);
5. linking of particles into chains (aggregation, colloidal);
6. chained into network and extension throughout the liquid (aggregation, pre-gel);
7. thickening into a gel (gel).

According to the literature, silicon helps in hardening the roots of plants, and is also essential for good plant growth and disease resistance. Leafs are strengthened through silicic acid formation which acts as a mechanical barrier. Silicon also connects plant substances such as sugars, proteins or phenolic compounds which are present in all kinds of plant fibers. Mycelia of fungi cannot penetrate the plant anymore. It increases the yield, induces resistance to stress, controls diseases and pests, reduces toxicity of certain minerals as manganese and aluminium, increases tolerance to freeze calamities, regulates water consumption and improves leaf erectness, resulting in photosynthesis enhancement. It is described that silicon is absorbed via the roots as orthosilicic acid. Usually, silicates, silica gel (kieselgel), meta-silicates, zeolites and other silicon compounds are used, however, having a low bioavailability.

New chemicals that are used in agriculture also induce polymerisation and aggregation of orthosilicic acid into colloids (e.g. fluorides, nitro- and chlorinated compounds, insecticides, antibiotics, fungicides etc.). By that, synergetic activity between roots and microbes, resulting in better bioavailability of minerals and solubilisation of silicates is omitted or reduced, which results in weaker plants with a lower mineral content. To circumvent this problem, plants have to get more fertilizers than necessary and also have to be protected by insecticides, fungicides, etc. more than necessary. This is especially a problem for plants on hydroculture.

In addition to the importance of silicon to plants, there is also evidence that silicon is an essential element for animals and humans (DE19530882). The question arises if silicon is also able to protect and strengthen animals and humans against infiltration of pathogenic microbes (bacteria, fungi) and could directly be related with certain physiological conditions. The human body contains a very substantial amount of silicon, far higher than most essential trace elements like Mn, Fe, Cu or Zn. Especially organs, connective tissue, cartilage and bones contain high amounts of silicon. Some studies show that the silicon contents decrease with age. Pregnant women have low silicon serum concentrations and the use of silicon supplements by them showed therapeutic action on the skin and lowers aluminium toxicity (Reffitt D. M, Jugdaohsingh R, Thompson R. P. H, Powell J. J.: Silicic acid: its gastrointestinal uptake and urinary excretion in man and effects on aluminium excretion. J. Inorg Biochem 1999; 76:141-6; and: Van Dyck K., Van Cauwenbergh R., Robberecht H., Deelstra H.: Bioavailability of silicon from food and food supplements. Fresenius J. Anal. Chem. 199; 363: 541-4). The use of silicon supplements also reduces aluminium toxicity. Aluminium inhibits bone formation and is correlated with neurological diseases like Parkinson and Alzheimer. Silicon is connected with the elasticity of the artery and blood vessel walls and enhances the immune system.

There are clinical reports on improvement of skin diseases, heart diseases, asthma, rheumatic diseases, psoriasis, bone diseases, etc. by using silica gels. Silica gels are used all over the world. However, these gels are poorly bioavailable because of difficulties to dissolve colloidal silicic acid.

Hence, to use silicon in an effective bioavailable way, one has to use a non-colloidal orthosilicic acid solution and one has to prevent colloid and gel formation. However, it is very difficult to inhibit colloid and gel formation in highly ($>10^{-4}$ mol Si) concentrated solutions at all pH values. Colloids and gels are not bioavailable but the colloids depolymerise slowly into smaller particles and orthosilicic acid. This depolymerisation is limited and not very reproducible since these colloids are relatively unstable and the polymerisation depends on water content, pH and salt concentration. This results in a very low concentration of orthosilicic acid, which sticks onto all kind of biological materials, in gastro-intestinal systems and rest colloidal material.

Next to silicon, boron is also considered as important trace element. Boron is a well documented essential element for plants. Deficiency results in growth inhibition (Ishii T, Matsunaga T, Hayashi N. Formation of rhamnogalacturonan II-borate dimer in pectin determines cell wall thickness of pumpkin tissue. In: Plant Physiology; 126: (4) 1698-1705 August 2001), and boric acid delays senescence of cornation flowers (Serrano M, Amoros A, Pretel M. T, Martinez-Madrid M. C, Romojaro F. Preservative solutions containing boric acid delay senescence of carnation flowers. Postharvest Biology and Technology, 23: (2) 133-142; November 2001). High concentrations of boron in water gives decreased crop yields. Boric acid is used as fungicide, insecticide and herbicide at different but high concentrations. As herbicide, it is a strong poison. It can act as desiccation compound or it can inhibit photosynthesis and suppress algae in swimming pools and sewage systems. As fungicide, it is used as a wood preservative. Boric acid is therefore used in agriculture and non-agriculture sites, especially in food and feed handling areas.

Boron is also used in humans for healing wounds, vaginal infections, in eye washes, in cosmetics, and in food as preservative or antimicrobial compound, as mild antiseptic. It also should have antiviral activity. The high toxicity limits its use as antimicrobial compound in animals and humans. Before 1980, boron was considered as a non-essential element in human nutrition. Recently numerous animal and human studies showed that it is also essential for normal growth as it is for plants and it is important for hormones involved and bone metabolism (testosteron and estrogen). It is also involved in bone mineralisation.

In nature boron (like silicon) is found in volcanic and other natural water (mineral springs) sources, and also as borates in minerals.

Combinations of silicon and boron in food additives or as medicaments are known from the literature. In e.g. DE19530882 a medicament is used that comprises 21.43 wt. % silicon (from silicea) and 2.14 wt. % boron (from borax). This medicament is used as solid or as liquid. A clear disadvantage is that silicon is not bioavailable in this way. Another document WO 00/27221 describes a solution to concentrate metals in plants, comprising at least 100 mg/kg silicon and at least 100 mg/kg boron. Here it is also a disadvantage that silicon is not, or hardly bioavailable. Also the ranges in which silicon and boron can be added, may lead to combinations which can have a negative effect on the bioavailability. For example, in humans high silicon intake may result in lithiasis, immunological effects or silicon accumulation. Both elements interfere also with the absorption of other minerals. High boron intake may increase testosteron and estrogen levels and may interfere with the parathyroid hormone function.

Boric and silicic acid are weak acids and poorly soluble in water. They are common in non-polluted water all over the earth and vital for mineral balance of plants, animals and humans. All these acids become depleted in polluted systems and their bioavailability decreases.

Also other combinations found in the literature do not use silicon in its bioavailable form and do not use the synergetic effect of boron on the bioavailability of non-colloidal silica. Further, there is also a need for a solution with high concentration of silicic acid, that can be used as stock solution, in which silicic acid is present in its non-colloidal form, notwithstanding its high concentrations and the presence of boron.

It is the object of the invention to make a solution with an increased bioavailability and activity of silicon (in the form of silicic acid) in the presence of boron (in the form of boric acid) in that solution. It is another object of the invention to prepare a high concentrated solution of silicic acid that does not polymerise and/or gel, that can be kept as stock solution for a long period, without polymerization of gelling of that solution in combination with boric acid.

SUMMARY OF THE INVENTION

The present invention includes an aqueous solution, comprising boric acid and non-colloidal silicic acid. This solution can also comprise a water absorbing additive. The solution contains bioavailable non-colloidal silicic acid, and the solution is stable for >1 year.

The invention also comprises a method for the preparation of a solution in which one or more silicon and boron compounds are hydrolysed in an acidic solution containing one or more dissolved (strong) water absorbing additives (humectant).

The invention also includes the use of this solution, in which, after dilution, the solution is added to plants or trees, to increase its resistance against one or more of the group of microbial infection, insects, pests, fungi, weeds, or extreme physical conditions or fed to fish. The invention also comprises the use of the solution, for use to strengthen connective tissue, bones, skin, nails, arteries, cartilage and joints in animals and humans.

DESCRIPTION OF THE INVENTION

It has now surprisingly been found that the bioavailability of a combination of non-colloidal silicic acid in combination with boric acid gives an enhanced bioavailability of the silicic acid.

The effects that are found are not found for one of these weak acids, but only when they are used in combination. The biological effects of adding silicic acid is much larger, when boric acid is added. Hence, the invention comprises an aqueous solution comprising boric acid and non-colloidal silicic acid. Hence, boron cannot only have its own function, the presence of boron also enhances the function of silicic acid. However, these effects are only obtained when the weak acids are used together, and silicic acid is not polymerised into big particles.

The function of boron as synergetic element in the solution with non-colloidal silicic acid is only present when the ratio of boron to silicon is not too high. The solution according to the present invention has a silicon-boron ratio between 1 and 1000.

Since the silicic acid should be present in a non-colloidal form to be bioavailable, formation of colloidal silicic acid should be prevented. This can be done by choosing the right concentration, e.g. a concentration below approximately $10^{-4}$ mol Si. The solution according to the present invention should be filterable through a 0.1 micron filter, e.g. a membrane filter. With filterable is meant that about 90% or more of the solution passes through the filter. When the concentration is too high and colloidal silicic acid has been formed, part of the solution will not pass the filter.

In this solution, the concentrations for silicon as silicic acid and boron as boric acid will be between approximately 0.0001 and 0.005 wt. % and 0.000001 and 0.005 wt. %, respectively, preferably between approximately 0.0001 and 0.01 wt. % and 0.000001 and 0.01 wt. %.

A solution, as above described, cannot have a large silicic acid concentration. This can be a disadvantage, when applying such a solution, or when storing such a solution. It means that large volumina are necessary. It has now surprisingly been found that a combination of a silicic acid, boric acid, and a strong water absorbing additive (a humectant, which is able to absorb water, to keep it absorbed and to prevent water from evaporating), can solve this problem. In this embodiment, the solution can now comprise high concentrations of non-colloidal silicic acid (e.g. 2 wt. % Si is reached), maintain the synergetic effect of the presence of boric acid, when the solution also comprises a water absorbing additive. Such a solution should have a low pH, below pH 2 and preferable below pH 1, e.g. 0.5. This low pH can be reached by adding acids like HCl or $H_3PO_4$. Because the pH is very low (e.g. <1), water and particles are highly protonated.

Mainly oligomers (small particles) are found: dimer, linear trimer, linear tetramer, up to heptamer, cyclic trimer, cyclic tetramer, cyclic pentamer and small derivates of these cyclic and linear compounds. These small compounds (± a few nanometers or smaller) are not growing anymore by the activity of the strong humectant, inhibiting their aggregation and precipitation. Boric acid absorbs to these small particles. These particles pass easily through 100 nanometer filters but pass more difficultly through a molecular filter lower than 10,000 MW (Da), e.g. an Amicon filter.

Sol particles larger than about 4 nm become heterogeneous and colloidal and cannot pass through a 0.1 micron filter or e.g. a 20,000 Mw filter. Because the small "particles" that are present in the solution of the invention pass easily through a 0.1 micron filter, the nature of the preparation cannot be a sol or gel (non-colloidal thus non-sol, non-gel). Furthermore, practically no "particles" are retained on a MW 20,000 filter or filters with a higher cut-off), which only allows very small particles (like the small oligomers and the small polymers of stage 2 and 3 (see above) to pass through. On the other hand oligomers are normally (after dilution) in balance with orthosilicic acid through dissolution. The solubility of orthosilicic acid is limited to the concentration of Si lower than 50 ppm. Taking into account these results, it is concluded that the synthesis of non-colloidal silicic acid results in a stabilisation of silicic acid oligomers with a low molecular weight and that the further formation of sol and gel is stopped through stabilisation of the oligomer. The concentration of orthosilicic acid (monomers) in the concentrated stock solution can be measured by the well known silico-molybdic acid reaction (R. K. Iler 1979 p. 95-105). Application of this method shows no positive reaction. This means that the stock solution of the invention is a solution comprising stabilised silicic acid oligomers (oligomeric particles), which are smaller than about 4 nm, and comprising no measurable free orthosilicic acid. These stabilised silicic acid oligomers do not polymerise further to a colloid (sol, aggregates) or gel, and are filterable through a 0.1 micron filter or e.g. a 20,000 Mw filter. This form of silicic acid in fase 2 and 3 is bioavailable.

Hence, the solution of the invention, comprising next to B, non-colloidal silica, i.e.: silica that is mainly in stage 2 (polymerisation of orthosilicic acid into small oligomers (mainly dimers, trimers and tetramers, linear or cyclic) and stage 3 (linear or randomly branched polymers (small particles, ±2 nm) (pre-sol)), and non-detectable smaller amounts of the monomer orthosilicic acid. This solution passes through a 0.1 micron filter. Though the monomer might be present (due to the equilibrium), preferably no measurable (silico-molybdic acid reaction) free orthosilicic acid is present. The invention is not directed to colloidal silica or silica as sols. Colloids comprise particles of approximately 5 to 100 nm (Kirk-Othmer, 'Colloids') and Römpp describes in his Chemie Lexikon silicasol as an aqueous anionic solution of colloidal amorphous $SiO_2$, with a mean particle size of 5-150 nm. It cannot be excluded that minor amounts of these species are present in the solution of the invention, but the solution of the invention substantially comprises non-colloidal silica (orthosilicic acid that is mainly in stage 2 and stage 3, as described above, which is bioavailable silicon).

The biological activity of the solution of the invention is surprisingly due to these particles: the small oligomers of silicic acid in combination with boric acid. Pure silicic acid has a lower activity. The humectant enables high concentration of silicic acid (non-colloidal silica) and prevents aggregation. Aggregation of these particles results in opalescence, turbidity, light reflection, colloid and gel formation and thus loss of bioactivity.

The additive is preferably chosen out the group of food additives (E and A list). Hence, the solution according to the present invention is a solution in which the water absorbing additive (humectant) may be polysorbate, a vegetable gum, a substituted cellulose, a polyglycerol ester of fatty acids, a polyethylene glycol, a polydextrose, propylene glycol, propylene glycol alginate, a polyoxy ethylene glycol ester, a pectine or amidated pectine, a sucrose ester of fatty acids, acetylated or hydroxypropyl starch, starch phosphates, urea, sorbitol, maltitol, a vitamin, etc. or mixtures thereof. The strong humectant attracts water and inhibits the aggregation of silicic acid into colloids. Silicic acid that is absorbed to the humectant-water complex will not aggregate.

To obtain a high concentration of non-colloidal silicic acid a high concentration of the water absorbing additive is necessary. The water absorbing additive in the solution of the invention is present in a concentration of at least 30% (W/V, Weight per volume for powders and V/V for liquids), preferably 40%. Such solutions can surprisingly be stored as stock solution and kept for a long time (>1 year) at room temperature before dilution and application in plants, animals and humans. Hence, in this way a solution is created with a high concentration of silicic acid, that can be used as stock solution, in which silicic acid is present in its non-colloidal bioavailable form, notwithstanding its high concentrations and the presence of boron. This solution has a pH below 2 and preferable below 1, has a silicon-boron ratio between 0.1 and 1000 and is filterable through a 0.1 micron filter, e.g. a membrane filter, and are also filterable through a 20,000 MW (Da), e.g. an Amicon filter.

For this concentrated solutions containing a water absorbing additive (or a combination of water absorbing additive), the concentrations for both elements in the form of acids can approximately be between 0.01 and 2 wt. % (Si) and 0.0001 and 4 wt. % (B), respectively (1% is 10 mg/ml).

It is known that B can also stabilise non-colloidal silica. However, this stabilisation only lasts for a short period, about a day. Furthermore, such stabilisation is only achieved when the amount of B is much higher than in the solution of the invention (e.g. at least 10 times higher than Si).

Boric, silicic and also fulvic acid (extract of fulvic material and heterogeneous material, comprising organic weak acids and minerals) are weak acids and poorly soluble in water. In low concentrations they are common in non-polluted water all over the earth. They are vital for mineral health of plants, animals and humans. All these acids become depleted in polluted systems and by that, their bioavailability decreases. We found that selected mixtures of these acids in liquid formulations at low concentrations stimulate normal health conditions and could be used as nutrient preventing several diseases and as anti-aging agents. Hence, the solution of the present invention can also comprise in a specific embodiment fulvic acid. In such a solution, fulvic acid is present in a final concentration between 0.1 and 10% (V/V).

Concentrated solutions like these, comprising non-colloidal silicic acid, boric acid (and optionally fulvic acid) and a water absorbing additive can be prepared in a way in which one or more silicon and boron compounds are hydrolysed in an acid solution containing one ore more dissolved water absorbing additives. During this method, the water absorbing additive (humectant) is dissolved in water and a strong acid is added. It can be necessary to bring or keep the water absorbing additive (e.g. PEG 400 or 600, polyethylene glycol with mean MW of 400 or 600, respectively) before adding the acid to approximately 20° C. Then, the solution is brought at a temperature of higher than about 20° C., but lower than approximately 40° C., e.g. 25° C., and held at this temperature for a few hours, e.g. 5 h, for good hydration. Boric acid can be added, e.g. in the form of crystalline material or alkali or alkaline earth borates. It is preferred to acidify and to fully hydrate the water absorbing additives (humectants as liquids or with water mixed powder), for some time at e.g. approximately a temperature >20° C., before adding silicate. Then silicon is added (e.g. an alkali or alkaline earth silicate solution). A good result was e.g. obtained with the addition of an identical volume of a diluted five or tenfold alkaline potassium silicate solution (12-18% Si) in water (water must have approximately a temperature >22° C.) which is added to the concentrated PEG-boric acid solution very slowly under stirring. The solution is heated until 25° C. in order to hydrate fully the humectant (to prevent precipitation of silicic acid). This means that the concentration of the humectant is initially at least 60%, preferably at least 80%, and after adding the silicon containing solution, the final humectant concentration is at least 30%, preferably at least 40%.

The invention also comprises the aqueous solution of acidified strong water absorbing additive and boric acid alone, that can be combined with a silicic acid solution, before use. After the combination, the obtained solution can be diluted and applied. For example, the humectant-boron solution is, before use, combined with the silicic acid solution and than e.g. diluted and sprayed on plants. Several combinations of solutions are possible, to obtain the solution of the invention.

The obtained solution has a high concentration of silicon and can be stored, without, or substantially without, colloid formation longer than a year (stock solution). Due to the low pH, the solutions will have to be diluted before use, such that an acceptable pH is reached. This pH will depend upon the application. The concentrated solution according to the present invention can, after dilution of the solution, be added to plants or trees. The solution is diluted with water from approximately 200 to 20,000 times, preferably 300 to 10,000 times and more preferably 500 to 3000 times, before adding to plants or trees. The diluted solution according to the present invention can be used to strengthen plants or trees, to increase their resistance against microbial infection, insects, pests, fungi, or extreme physical conditions like freezing.

It is clear that the (concentrated) solution added to the plants or trees, may also contain other additives. These additives can for example be added after dilution of the concentrated solution. The additives can also be added to the concentrated stock solution. The person skilled in the art will choose the appropriate way. Additives are for example, minerals, nutrients, anti-microbial agents, insecticides, pesticides, fungicides, herbicides, etc., or combinations thereof. Preferably, these additives do not substantially decrease the solubility of silicic acid in the solution or promote colloid formation. However, when the solution according to the invention is used (after dilution) to spray e.g. fruit, usually the less fungicides etc. are necessary, because of the improved fruit quality.

The concentrated solution of the present invention can, after dilution, be added by spraying on plants or trees and/or their leaves or by adding the solution to the medium in which the plants or trees have their roots. As described above, this will enhance the health of the plants or trees. It is also a way to concentrate boron and silicon in e.g. vegetables and fruits. Vegetables and fruits can than be used for human consumption.

Good results, e.g. on fruit like bananas, apples, grapes, pears, etc., on rice, unions, potatoes, tomatoes, etc., but also on flowers etc., can e.g. be obtained with a solution that has a Si concentration of about 0.1 to 1, preferably about 0.2 to 0.6 wt. %, a B concentration of about 0.01 to 0.5, preferably about 0.05 to 0.2 wt. %, and as humectant PEG 400 in an amount of about 30 to 60, preferably about 35 to 50 wt. %. The pH of this solution is about 0.3 to 0.7, preferably about 0.4 to 0.6.

The (concentrated) solution of the present invention may also be used after saturation in superabsorbers like polyacrylates (sodium polyacrylate or homo polyamino acid compounds like poly aspartate, or natural materials like clays or zeolites, etc). Mixtures of these compounds together with soil substrates can be used as slowly releasing agents, for example slowly releasing Si and B to plants.

The (concentrated) solution of the present invention can also be used, after dilution, to strengthen fish (including shellfish) and to increase their resistance against microbial infection. The solution will usually be diluted approximately 1000 to 30000 times, before adding to the fish. It can for example after dilution be added to the basin of the fish, such that the appropriate concentration of the acids is obtained. This solution can also be used to concentrate boron and silicon in algae.

This solution can also be used in combination with minerals, nutrients, anti-microbial agents, or combinations thereof. These additives can for example be added after dilution of the concentrated solution. The additives can also be added to the concentrated stock solution. The person skilled in the art will choose the appropriate way.

The (concentrated) solution of the present invention can also be used, after dilution, in humans and animals to strengthen e.g. connective tissue, bones, skin, nails, arteries, cartilage and joints. Humans and animals benefit from both the bioavailable silicon and boron, and especially the synergetic effect of increased bioavailability of silicon by the presence of boron. The solution, after dilution, can be used for the treatment of diseases related with of bone, skin, arteris, connective tissue, cartilage, joints, osteoporosis, rheumatic diseases, arteriosclerosis, hair, nail and skin diseases, cardiovascular diseases, allergic diseases, artritis, degenerative diseases, etc. The solution should be used in a therapeutic form, this means including possible physiological acceptable additives. This can e.g. be done by adding drops of an undiluted or diluted solution to drinks, using the undiluted or diluted solution in the preparation of foods as food additive or as supplement, and other methods, known to the person skilled in the art. The solution can also be used in cosmetics, therapeutic creams and ointments, shampoos, gels, etc., and in the preparation thereof.

The final dilution should be such, that an acceptable pH is reached. This will depend upon the application. Usually, the dilution with water (or water based liquids) will range from approximately 10 to 500 times, before intake. If necessary, the dilution can be less or more. When diluting the solution or increasing the pH of the solution, e.g. in the course of an application, it is preferred that the pH is not higher than about 4-6. When the pH is higher than about 6, the beneficial effects decrease. Hence, the solution will mainly be used at acid pH's (less than about 6). Smaller dilutions (like about <20 times) may provide less stable diluted solutions, whereas stronger diluted solutions (like about larger than 500 or 1000 times) may provide longer stable solutions for application.

Also the intake and/or the frequency of use of e.g. cosmetics comprising the (diluted) solution of the present invention will depend upon the application. The total human intake per day may approximately be 0.5 to 10 mg Si for a 50 kg body weight (animals and humans); in cosmetics, the concentration may approximately be 0.5 mg/ml to 0.0001 mg/ml Si in cosmetics.

Depending upon the application, the (concentrated) solution of the present invention can contain additives like flavouring agents, sweeteners, colouring agents, preservatives, stabilising agents, etc. These additives can for example be added after dilution of the concentrated solution and before use. But the additives can also be added to the concentrated stock solution. The person skilled in the art will choose the appropriate way. Preferably, these additives do not substantially decrease the solubility of the non-colloidal silicic acid in the solution and do not promote colloid formation or gelling. The person skilled in the art will also choose the appropriate dilution before use.

EXAMPLES

Experiment 1: Influence of Boron on Silicon Toxicity

In our experiments the leaves of salad plants (cobbage lettuce) were sprayed with freshly made soluble orthosilicic and non-colloidal silicon solutions at 0.01% (W/V)) Si in propylene glycol 5% (V/V) every day for two weeks. Potassium silicate was used as source for Si. The solutions were freshly used; no filtration was applied. Plant growth was completely stopped and the plants became very rigid. Addition of 0.001% boron as boric acid to the silicic acid solution decreased the toxicity again (growth) but plants were still too rigid. Control experiments with only 0.001% Boron in 5% propylene glycol showed no effect (placebo). This shows that boric acid is involved in the metabolism of silicic acid and that the ratio Si/B is important.

Experiment 2: Antimicrobial Activity of Boric Acid with or without Silicon

Solutions of boric acid in water were prepared containing different concentrations of boric acid: 1%, 0.1%, 0.03%, 0.01%, 0.005%, 0.0003% and 0.0001% (W/V). Sodium silicate (10% Si) was diluted tenfold in water and further 1000 times diluted in the solutions or in water with pH 4.5 after dilution, resulting in a final silicon concentration of 0.0010 wt. % (or 10 µg/ml Si)

All solutions were filtered on a 0.1µ membrane filter. Clear solutions were obtained. The solutions were used instantaneously. A potato garden was used to test the compounds against infection with *Phytophthora* infestan: 20 m$^2$ culture were used for testing and each m$^2$ contained 6 potato plants (strain Bintje) of two months old. Two times a week plant leaves were sprayed with the different solutions (about 10 liters/are). Four square meters were used as placebo.

Results:

After ±2 months omnipresent *Phytophthora* infection started on the leaves of the potato plants. All control plants showed green to black spots on the leaves and became slowly necrotic. Surprisingly, all boron treated plants were also infected, except the plants treated with silicon (10 µg/ml) and low concentrations of boric acid, when the boron concentration was not higher than the silicon concentration.

High concentrated boron solutions even showed toxic reactions (necrotic effects on leaves such as black spots, holes, etc.) after 1 week treatment of the plants (1%, and 0.1% and 0.03% boric acid) but no antifungal effect. Silicon alone only retarded somewhat the fungal infection. All silicon treated plants were stronger (even without boron). From 0.003% boric acid on, plant leaves were stronger and fungal infection decreased. The best results showed about 70% reduction of intoxicated plants.

Experiment 3

Solutions were prepared as described in experiment 2:

boric acid 0.0003%, silicon 10 µg/ml (1)

boric acid 0.0001%, silicon 10 µg/ml (2)

silicon 10 µg/ml (3)

The solutions were stored at room temperature during 2 months, followed by filtration through a membrane filter of 0.1µ (Millipore type 0.1 micron). Filtrates were 2 times a week applicated in further experiments as spray for application on leaves of potato plants (3 months old)

Results:

Practically all plants showed normal necrotic effects of *Phytophthora* infection. Also strengthening of the leaves was found like in experiment 2. Only solution 2 showed some decreased numbers of spots in the start phase of infection and some retardation of the infection.

These results show that the active compounds in the solution were inactivated by colloid formation 2 months after the preparation (since the solutions were not stabilised with a humectant). Boron and silicon at low concentrations show a synergetic effect on plant resistance to fungal infection. Boron acts as a co-factor for the silicon activity against fungal infection. Combined acids in a slightly acidic medium are effectively absorbed through the leaves of the plants.

Experiment 4: Active Particles are Filterable on a Molecular Filter (≠Orthosilicic Acid)

The solutions of experiment 2 containing boric acid 0.0003%+silicon 10 µg/ml and only silicon 10 µg/ml in water were filtered (after membrane filtration, 0.1 micron) on a molecular filter with cut off 5000 Dalton (Amicon filter 5000 Dalton). After preparation of the solutions experiment 2 was repeated. Both solutions showed strongly decreased activity compared to similar solutions of experiment 1 without molecular filtration, indicating that orthosilic acid is not responsible for the synergetic activity of both compounds. (Silicic acid is not retained by the filter).

The molecular filtration omits small material which is responsible for the biological activity. Orthosilicic acid is still present in the solution, but the activity is decreased. This means that the non-colloidal silica in a solution of the invention that pass a 0.1 micron filter, but does not on a molecular filter with cut off 5000 Dalton is the form of non-colloidal silica that should be present (together with boron).

Experiment 5: Preparation of Stock Solutions: Test of the Stability in Time

Concentrated liquid sodium and potassium silicates were used as starting materials (13% W/V Si as silicate; see also exp. 7). Concentrated solutions were first five to tenfold diluted in different concentrated humectants acidified until pH 0.5. These stock solutions contained up to 1% Silicon and up to 0.1% Boron. Only addition of highly concentrated humectants such as non-toxic food additives like polysorbates, polyethylene glycols, propylene glycol, urea, polydextrose, sorbitol, etc. resulted in stable solutions of both weak acids.

All these humectants are highly mixable with water and also mixable with different kinds of silicates or silanols. Only strong humectants (e.g. those that absorb water about 0.5 times or stronger water than glycerol) were able to inhibit colloid and gel formation of silicic acid after long time: more than 6 months at room temperature, still filterable through a 0.1 micron filter (=no colloid). The stability in time for more than 100 strong humectants and their combinations was observed during 3 weeks at 50° C. (10 strong humectants were selected, different concentrations and combinations were used). It was concluded that the humectant concentration must be at least 30%, preferably 40%, in the final acidified stock solution to inhibit colloid formation. Only with selected humectants solutions were obtained filterable on a 0.1µ membrane filter without loss of filter flow rate after three weeks.

Examples of such strong absorbing additives are PEG 200, PEG 400, PEG 600, PEG 800, propylene glycol, urea, dextrose, polysorbate, sorbitol, galactose, cellulose, dextran, vegetable gum, and combinations thereof. Lower concentrations than 30% W/V resulted in colloid and gel formation after 3 months or even earlier in some cases.

Biological Test of Type Humectants

Experiment 6: Preparation of Stock Solutions of Both Acids: Search of for a Good Stabilisation of the Active Particles (Non-Colloidal) and of the Biological Activity In order to use economically the synergetic effect, two plants were selected as antifungal model: Lollo Bionda (a salad) and White Lisbon (an onion). In both cultures strong antifungal compounds are used to inhibit fungal infection (*Botrytis*), resulting in leaf blight. Plants are cultivated outside during March-August, completely without Botrytis after treatment with antifungal drugs. No treatment results in heavy infection. We replaced now the antifungal treatment (once a week spray) by several diluted stock solutions.

PEG 400 and propylene glycol (Merck) at 40% final concentration (V/V) were used as type humectant and different concentrations silicic acid—boric acid, Si 6 mg/ml; Si/B ranged from 1/1 to 1/300, were prepared for use on the two types of plants. The stock solution was 1000 times diluted before use. The best results for preventive antifungal activity and increased plant growth was silicon/boron >1.5 The ratio could even be extended up to 300 without losing big biological activity. It is totally new that very low concentrations of boric acid increase the activity of silicic acid and act as co-factor.

Experiment 7: Preparation of Stock Solution (to be Diluted Before Use)

5 liter PEG 600 (Merck) is brought at a temperature of 20° C. and 300 ml concentrated HCL (first diluted with 300 ml aqua dest.) is added. This solution is brought at 25° C. and kept at this temperature for about 5 h. Then, 2 gram boric acid (crystalline) is added and solved. Then, 500 ml concentrated potassium silicate solution, diluted in 4.5 liters aqua dest. are slowly added, while stirring. The resulting solution contains 0.6% Si and 0.2% Boric acid (Si/B: 18) and the final pH is ±0.4.

Quality Control: Non-Colloidal Solutions of Silicic and Boric Acid

The solution must be stable even 1 year after the preparation, incubated at room temperature. In order to fulfil this condition, the solution must be completely clear (transparent), show no opalescence or have colour, show no effect in a turbidimeter (light reflection) and should filterable without flow reduction on a 0.1 micron filter after three months at 50° C.

Fivefold dilutions of the stock solution in a phosphate buffer pH 6.5 results in complete gel formation after 10 minutes, showing that a too high pH immediately results in gel formation. The solution is only partially retained in a molecular filter with cut off 5000 after 1/10 dilution, in preparations with PEG 400 or propylene glycol)

Experiment 8: Test with Patients 10 volunteers (2 men, 8 women) in good general health condition, no hair, skin or nail diseases, normal hair and nail growth were chosen. Some older (30%) patients had rheumatic complains. They received (in a small 50 ml plastic vial) made with PEG 400 (see above).
a stock solution with boron (0.03% W/V B) and silicon (0.5% W/V Si)
b stock solution without boron
c stock solution without boron and silicon
d stock solution without silicon All patients received blind the four stock solutions consecutively for oral use in different order. Each patient took every day and during 3 days one drop (60 µl) in order to evaluate the quick biological effect of the different solutions. Between the use of two different consecutive solutions a wash-out period was observed during one week. Evaluation of the biological activity was done on day 5 after starting a specific treatment.

Conclusion after 3 months consumption of the different solutions. A remarkable effect on nail and hair growth was found:

70% of all patients found no effect after taking solution d (only boron),

80% of all patients found no effect after taking solution b (only silicon).

80% of all patients found no effect after taking solution c (the placebo),

90% of all patients found drastic effects after taking solution a.

Surprisingly in our experiment most patients (90%) receiving the synergetic formulation claimed strong effects already after 5 days. The effects that were mentioned are: much stronger nails (90%), pain relief neck (10%), and pain relief knee (10%). The pain relief in two patients with rheumatic complaints continued even 5 and 3 days later. 40% of all patients claimed also stronger hair and nail growth after the complete experiment and 50% of the patients remarked that their natural hair fall was decreased after the complete treatment.

Because the daily intake of silicon by food and water is about 40-60 mg/day and of boron is about 3-10 mg/day, according to the literature the intake of such low concentrations (1 drop containing 0.5% W/V Si only) of silicic acid or boric acid separately should not promote quick biological effect. Only a treatment with higher concentrations during several weeks should promote some effects.

These results show that a short oral treatment with the synergetic formulation only, promoted direct biological effects in patients (pain relief, strong nails) and also that the non-colloidal silicic acid—boric acid formulation is highly bioavailable in humans.

Experiment 9: Improvement of Brittle Nails

Two patients with brittle nails received every day 2 drops (0.12 ml diluted in a glass of mineral water) of solution (solution a, exp. 8) during one week. Both patients claimed remarkable stronger nails during at least 2 weeks after the treatment.

Experiment 9: Hair Loss Decrease

Two patients with hair fall problems (48 and 57 years, male) were chosen. Both received everyday 2 drops of solution (solution a, exp. 8). During 1 week both patients claimed more than 50% less hair loss in the first week after the treatment.

Experiment 10: Increase Hair Growth

Three female patients with newly coloured hair were asked to measure the rate of their hair growth (newly formed hair) during 2 months before the experiment (control value). After a second professional hair coloration, the oral treatment with different solutions was started. Each patient started the treatment the same day of the colour treatment. Every day the patients took 2 drops of solution a (exp. 8). After 60 days the new hair growth evaluation followed. All patients measured longer hair after 2 months. The mean growth ratio for treated and non treated hair was 1.3 for the 3 patients. They evaluated their hair growth during 6 months by coloration every 2 months and measurement the out-growth (mean in cm of out-growth on 5 different places). They also remarked stronger nails and faster nail growth. One patient with a tennis elbow claimed pain relief and 1 patient with shoulder tendinitis (chronic) also claimed substantial pain relief.

Experiment 11: Influence of Low Dosis on the Resistance and Immunological System of Rainbow Colloidal Trout in Culture Against Fungal Infection Fungi provoke generally secondary infections in fish and they occur mostly when other trauma, such as injury (wounds) or diseases create an opportunity for fungal infection. A typical example is *Saprolegnia*, an ubiquitous fungus and normal habitant of freshwater. This fungus attacks in cases of malnutrition, stress, shock conditions, parasitism, low oxygen, wound formation with bacterial infection (injuries). Fishes develop white cotting tufts starting on both sides of the mouth and expanding all over the body. Rainbow trout is very susceptible to Saprolegniasis or similar fungi. The impact is big in lakes and fisheries and is responsible for poor quality of fish flesh. Fish quickly appear with white and grey patches with a cotting fibre appearance on the skin.

It is generally accepted that the infection kills the fish and the flesh of infected fish is not recommended. The immune status of the fish seems to be very important for the development of the disease. Treatment of the infected fish is practically impossible without use of very toxic compounds.

Rainbow trout was cultivated in a basin of 8×4×2 meters. 300 fishes with average weight of 350 grams are cultivated during spring and summer. Temperature of the water is ±16° C., flow-source water, silicon content <1 mg/liter, boron content <1 mg/liter.

Normally in summer the fish become infected with the fungi, starting with white to grey spots in the corner of the mouth and on infected open wounds due to the typical movement of the fish. Without antifungal treatment the fish becomes totally infected in two months and dies. With the appearance of the first symptoms we closed the water supply and added solution a (solution of experiment 7, but now with PEG 400) in a dilution of 20,000. The final Si and boron concentration is extremely low and a direct antifungal effect is excluded. The incubation period was 2 days. Source water flow was opened again after the treatment. The treatment was repeated every three weeks. All fish survived and the infection gradually disappeared completely until 3 months after the treatment. The fish was killed and the culinar properties were excellent.

The experiment was repeated. 10 control fishes were removed from the basin and kept in a small basin. Unlike treated fish, the non treated fish become infected and died.

These experiments show that very high dilutions of our solution with boron and silicon are able to protect the fish against fungal infection and that the immunological status of the fish is restored by the treatment. The use of silicates or other mineral compounds alone did not result in the same protection.

Experiment 12: Application of the Solution on Gala and Royal Gala Fruit (in South Africa)

The solution, containing about 0.4 wt. % Si, about 0.1 wt. % B and about 45 wt. % PEG 400, having a pH of about 0.5, was about 800× times diluted before use and applied to Gala and Royal Gala Fruit (apples). The fruit was treated each week during a period of 6 weeks, spraying each week 350 ml. of the solution per ha.

Three samples were taken of both fruit types. The results are presented in the following table:

| Sample Date | Sample ID | Fruit Size | Weight | Firmness | Fruit Colour | Seed Colour | Red Colour | % TSS | % Acid | Starch |
|---|---|---|---|---|---|---|---|---|---|---|
| | | | | | Gala | | | | | |
| | 25970 | 62.2 | 108.3 | 12.1 | 1.0 | 1.0 | 4.9 | 11.7 | 0.39 | 0.1 |
| 15 jan | control | 61.1 | 107.1 | 11.1 | 1.3 | 1.2 | 3.3 | 11.5 | 0.37 | 0.0 |
| | In-/decrease | 1.1 | 1.2 | 1.0 | −0.3 | −0.2 | 1.6 | 0.2 | 0.0 | 0.1 |
| | 26076 | 65.5 | 140.3 | 12.4 | 1.1 | 1.0 | 5.7 | 11.9 | 0.42 | 5.9 |
| 21 jan | control | 62.6 | 118.5 | 9.5 | 1.6 | 1.3 | 3.5 | 11.6 | 0.38 | 33.1 |
| | In-/decrease | 2.9 | 21.8 | 2.9 | −0.5 | −0.3 | 2.2 | 0.4 | 0.0 | −27.2 |
| 28 jan | 26362 | 68.8 | 151.7 | 12.8 | 1.2 | 1.1 | 8.6 | 12.1 | 0.37 | 41.5 |
| | control | 64.1 | 138.3 | 9.6 | 1.9 | 2.2 | 4.3 | 11.9 | 0.39 | 38.9 |
| | In-/decrease | 4.7 | 13.4 | 3.2 | −0.7 | −1.1 | 4.3 | 0.2 | −0.0 | 2.6 |
| | | | | | Royal Gala | | | | | |
| 14 jan | 25832 | 60.6 | 107.7 | 10.9 | 1.0 | 1.0 | 7.5 | 10.1 | 0.44 | 1.0 |
| | control | 58.4 | 103.6 | 9.4 | 1.2 | 1.2 | 4.3 | 12.1 | 0.38 | 0.4 |
| | In-/decrease | 2.2 | 4.1 | 1.5 | −0.2 | −0.2 | 3.2 | −2.0 | 0.1 | 0.6 |

| Sample Date | Sample ID | Fruit Size | Weight | Firmness | Fruit Colour | Seed Colour | Red Colour | % TSS | % Acid | Starch |
|---|---|---|---|---|---|---|---|---|---|---|
| 21 jan | 26074 | 64.5 | 138.2 | 11.2 | 1.1 | 1.0 | 8.6 | 9.8 | 0.39 | 2.5 |
| | control | 59.9 | 130.4 | 9.5 | 1.3 | 1.3 | 4.4 | 12.3 | 0.37 | 0.8 |
| | In-/decrease | 4.6 | 7.8 | 1.7 | −0.2 | 09.3 | 4.2 | −2.5 | 0.0 | 1.7 |
| 28 jan | 26361 | 69.8 | 156.3 | 11.9 | 1.1 | 1.1 | 8.9 | 10.1 | 0.38 | 41.5 |
| | control | 60.1 | 131.8 | 9.6 | 1.6 | 1.4 | 4.5 | 12.5 | 0.39 | 40.8 |
| | In-/decrease | 9.7 | 24.5 | 2.3 | −0.5 | −0.3 | 4.4 | −2.4 | 0.0 | 0.7 |

It appears that after 6 weeks, the fruit size, weight, firmness, colour, TSS value (TSS=total soluble solids, which refers to the sugar amount) and the amount of starch was in all cases higher than untreated fruit.

Experiment 13: Improvement of Fruit Quality (Jonagold Apples and Conference Pears)

At the RSF research Station of Gorsem in Belgium, Jonagold apples and Conference Pears were treated in the same way as in Experiment 12. Treated and untreated fruit was compared and it appeared that the treated apples had more juice in the fruits, had a significant better green background colour. Further it appeared that there was no effect on the mineral composition of the fruits.

With respect to the pears it appeared that on the shadow side of the fruits, a significant higher index of refraction in the fruit was measured after the treatment (which means that the fruit has a higher sugar amount). Further, the mean fruit weight and fruit diameter of the treated fruit tended to be higher. Further, also here it appeared that there was no effect on the mineral composition of the fruits.

Experiment 14: Strengthening of the Chrysanthemum 'Vesuvio Green'

Of some flower, the peduncles are painted. This leads to a reduced shelf life of the flowers (a decrease of about 40 days (unpainted) to 27 days (painted)). Next to that, painted flowers have an increased oxidation of the leaves (leave burning).

A solution (stock), containing about 0.5 wt. % Si, about 0.1 wt. % B and about 45 wt. % PEG 400, having a pH of 0.5, was 500 times diluted with tap water. The pH was about 6 and the temperature of the solution was about 17° C. About 1 liter was used to spray 20 m$^2$ (50 cc diluted solution per m$^2$), such that the flowers (sprigs) were covered with a film visible to the eye. After spraying, the flowers were not sprinkled (with water or herbicedes/pesticedes etc.) for 24 hours. During 7 weeks, each weak, in regular intervals, 7 times was sprayed for a period of 4 hours. Each time, a fresh solution was made by diluting the concentrated solution (stock).

Flowers that were treated with the solution of the invention (after dilution and spraying the diluted solution) showed a strong improvement of the uptake of water and dyes (compared to flowers that were only treated with tap water). This can be declared by a more regular structure of the vascular system resulting in less obstructions for the uptake. Further, the treatment resulted in a longer shelf life.

The invention claimed is:

1. A bioavailable silicic acid aqueous solution, comprising boron as boric acid in the amount of 0.0001-4 wt % boron, silicon as silicic acid in the amount of 0.01-2 wt % silicon and a water absorbing additive, wherein the solution has a pH-value below 2, wherein the silicic acid is stabilized silicic acid oligomers, which are smaller than 4 nm.

2. The solution according to claim 1, wherein the solution is filterable through a 0.1 micron filter.

3. The solution according to claim 1, wherein the solution is filterable through a 20,000 Mw (Da) filter.

4. The solution according to claim 1, wherein the silicon-boron ratio is between 0.1 and 1000.

5. The solution according to claim 1, wherein the water absorbing additive is a polysorbate, a vegetable gum, a substituted cellulose, a polyglycerol ester of fatty acids, a polyethylene glycol, a polydextrose, propylene glycol, propylene glycol alginate, a polyoxy ethylene glycol ester, a pectine or amidated pectine, a sucrose ester of fatty acids, an acetylated or hydroxypropyl starch, starch phosphates, urea, sorbitol, maltitol, a vitamin and mixtures thereof.

6. The solution according to claim 1, wherein the water absorbing additive is present in a concentration of at least 30%.

7. The solution according to claim 1, further comprising fulvic acid.

8. The solution according to claim 7, wherein fulvic acid is present in a final concentration between 0.1 and 10% (V/V).

9. A method of preparing a bioavailable silicic acid solution according to claim 1, wherein one or more silicon and boron compounds are hydrolysed in an acidic solution containing one or more dissolved water absorbing additives.

10. The solution of claim 1, wherein the solution is diluted.

11. The solution according to claim 10, wherein the solution is diluted with water from 200 to 20,000 times.

12. The solution according to claim 1, wherein the solution is used in cosmetics, therapeutic creams and ointments, shampoos or gels.

* * * * *